Feb. 8, 1966  A. D. RICKEL  3,233,557
AUTOMOBILE CONVEYOR
Filed June 7, 1965  2 Sheets-Sheet 1
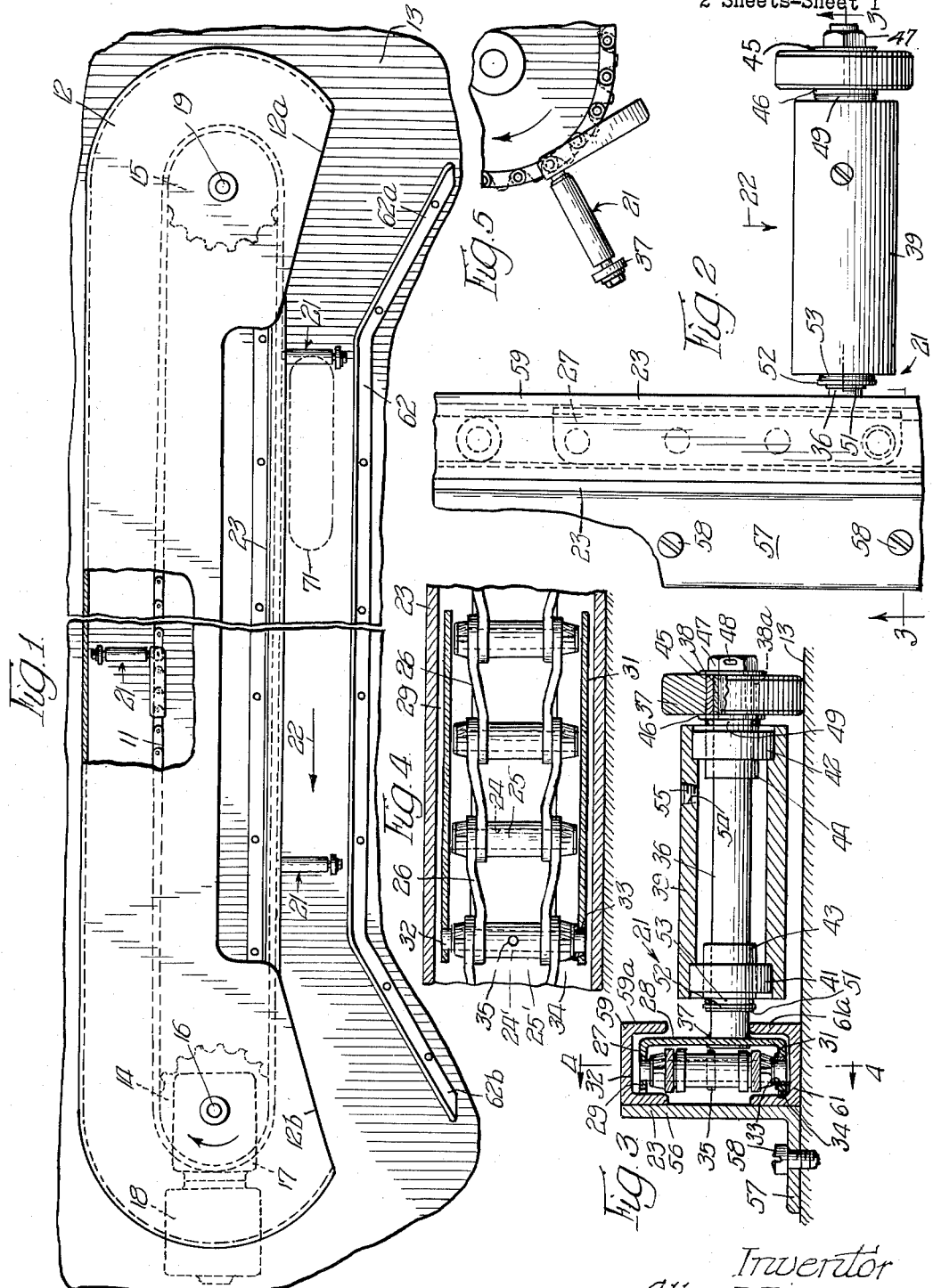
Inventor
Allen D. Rickel.
By Hume, Groen, Clement & Hume.
Attys.

Feb. 8, 1966  A. D. RICKEL  3,233,557
AUTOMOBILE CONVEYOR
Filed June 7, 1965  2 Sheets-Sheet 2
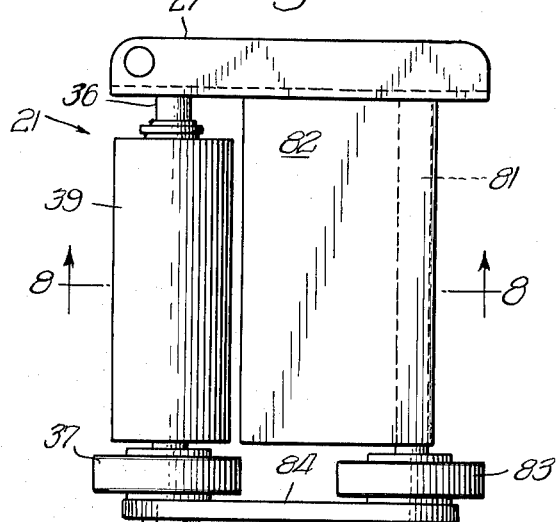
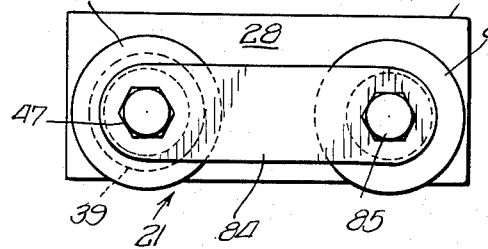
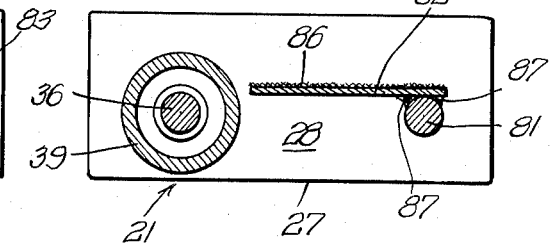
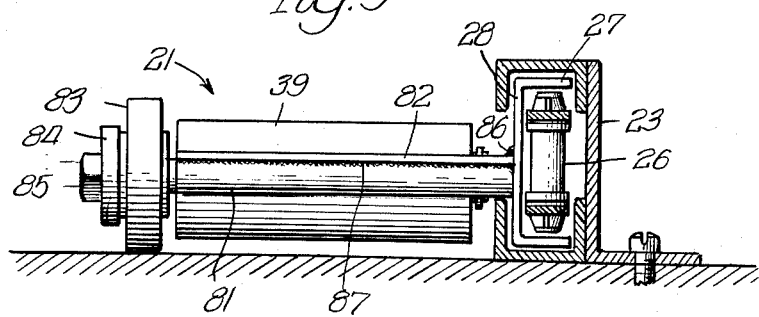
Inventor:
Allen D. Rickel,
By Hume, Groen, Clement & Hume.
Attys

United States Patent Office 3,233,557
Patented Feb. 8, 1966

3,233,557
AUTOMOBILE CONVEYOR
Allen D. Rickel, Northfield, Ill., assignor to Perfecto, Incorporated, Northbrook, Ill., a corporation of Pennsylvania
Filed June 7, 1965, Ser. No. 465,829
14 Claims. (Cl. 104—172)

This application is a continuation-in-part of application Serial No. 447,654, filed April 13, 1965.

This invention relates to conveyors and, in particular, to automobile conveyors for use in automatic car-wash facilities and the like.

It is conventional practice in present car-wash facilities for each automobile to be manually hooked by its front bumper to a chain conveyor as it enters the car-wash and then manually unhooked at the exit from the car-wash. This rather cumbersome practice frequently causes damage to the bumpers.

Accordingly, it is a primary object of the present invention to provide an automobile conveyor which automatically engages and disengages from the automobile.

It is another object of the present invention to provide an automobile conveyor including a plurality of rollers each of which propels an automobile forward by bearing against the rear portion of one tire.

It is an additional object of the present invention to provide an automobile conveyor including a plurality of tire-engaging rollers mounted at intervals on a chain traveling in a horizontal circuit, which conveyor is particularly characterized by minimum chain wear and by means which prevent bind and drag conditions.

It is a specific object of the present invention to provide an automatic automobile tow conveyor which includes an endless pintle chain driven in a horizontal plane by a pair of power-driven sprocket gears which are spaced a substantial distance from one another, a plurality of elongate yokes affixed at their forward end to preselected pintle shafts of the pintle chain, a roller projecting outwardly from each of the yokes to bear against an automobile tire, and an elongate guide for receiving and guiding the pintle chain and the yokes while the same are traveling in the conveying portion of the pintle chain circuit.

These and other features and objects of the present invention will be better understood by reference to the following detailed description and to the accompanying drawings wherein:

FIGURE 1 is a plan view of a complete installation of the automobile tow conveyor.

FIGURE 2 is an enlarged partial plan view illustrating one of the yoke and roller assemblies riding in the guide member.

FIGURE 3 is a cross-sectional view taken at 3—3 of FIGURE 2.

FIGURE 4 is a cross-sectional view taken at 4—4 of FIGURE 3.

FIGURE 5 is a partial top plan view illustrating the positioning of one of the yoke and roller assemblies as it moves around one of the gears.

FIGURE 6 is a plan view of a modified yoke and roller assembly.

FIGURE 7 is an end view in elevation of the modified yoke and roller assembly.

FIGURE 8 is a cross-sectional view taken at 8—8 of FIGURE 6.

FIGURE 9 is a rear elevational view of the modified yoke and roller assembly mounted on the pintle chain and engaged in the guide member.

Referring now to FIGURE 1, there is shown a complete installation of a preferred form of the automatic automobile tow conveyor. The installation includes an endless pintle chain 11 mounted on a pair of sprocket gears 14 and 15 for travel in a horizontal plane spaced relatively closely to the floor 13. The pintle chain 11 is of conventional structure. As best illustrated in FIGURE 4, each conventional link of the pintle chain includes a vertical pintle shaft 24 disposed within a vertical tubular member 25 for free rotational movement relative to the tubular member 25. Each end of the tubular member 25 is affixed to one end of a link member 26. The opposite end of the link member 26 is secured to one end of the pintle shaft of the next succeeding link. While the drawings show a specific type of pintle chain, it will be apparent that any pintle chain may be used, i.e. any chain having a vertical portion or pintle in one link about which an adjoining link is adapted to rotate in at least a horizontal plane.

Referring again to FIGURE 1, it is seen that the drive gear 14 is secured to a vertical shaft 16 driven through a suitable sealed transmission 17 by a sealed heavy-duty electric motor 18. The motor 18 and the transmission 17 are preferably mounted below the floor level in order to obtain the most efficient installation arrangement. The idler gear 15 is secured on a bearing-mounted vertical shaft 19. The idler gear 15 is spaced a substantial distance from the drive gear 14 as determined by the requirements of the particular installation.

A plurality of yoke-and-roller assemblies 21 are secured to the pintle chain 11 and spaced at selected intervals.

As best illustrated in FIGURES 2 and 3, each of the yoke-and-roller assemblies 21 comprises an elongate yoke 27 having a side wall 28 integral with a top wall 29 and a bottom wall 31 so as to normally overlie the top, bottom, and outer side of a length of the chain 11. The yoke 27 can be readily made up from 3/16 inch steel channel stock. Each yoke 27 is affixed at its forward end to one of the pintle shafts. For this purpose, the normal pintle shaft is replaced with a pintle shaft 24' of greater than normal length so that the ends of the pintle shaft 24' can be affixed in the reamed holes 32 and 33 in the top wall 29 and bottom wall 31, respectively, of the yoke 27. To obtain a tight fit of the pintle shaft 24' in the yoke 27, a bushing 34 is force-fit into the larger reamed hole 33, and the lower end of the pintle shaft 24' is then force-fit into the bushing 34. It will be noted that the yoke 27 extends rearwardly from the pintle shaft 24' to normally overlie three successive pintle shafts 24 to which, however, it is not attached. It will also be noted that a pin 35 extends through the pintle shaft 24' and its associated tubular member 25', preferably in a plane normal to the side wall 28 of the yoke 27. The pin 35 is secured in position by a threaded connection or other conventional means. The purpose of this arrangement, as will be made apparent further on, is to fix the yoke 27 orientation relative to the tubular member 25' and its associated link.

The yoke-and-roller assembly 21 further includes a roller shaft 36 which may be readily fabricated of one inch diameter round steel stock. One end of shaft 36 is tightly fitted into a reamed hole 37 in the lower portion of the yoke side wall 28 and is rigidly affixed to the yoke side wall 28 by welds. In some instances, it may be found desirable to pass the shaft 36 through a gusset (not shown) affixed to the outer surface of the yoke side wall 28 in order to strengthen the connection between the shaft 36 and the yoke side wall 28. It will be noted that the shaft 36 is spaced between the tubular member 25' and the next succeeding tubular member 25 and extends outwardly from the yoke side wall 28 at right angles thereto.

The free end of the shaft 36 has a reduced diameter portion over which is disposed a sleeve 38. A preferably steel wheel 37 provided with a central, oil-impregnated bronze bushing 38a is mounted on the sleeve 38 for free rotation about an axis coincident with the axis of the shaft 36.

Intermediate the wheel 37 and the yoke side wall 28, a seamless steel tubular roller 39 of smaller outside diameter than the wheel 37 is mounted on the shaft 36 for free rotation about an axis coincident with the axis of the shaft 36. Specifically, the roller 39 is mounted on sealed bearings 41 and 42 which are press-fit into the respective ends of the roller 39. The sealed bearings 41, in turn, are provided with central sleeves 43 and 44, respectively, engaged about the shaft 36.

It will be noted that the wheel 37 is disposed between a pair of washers 45 and 46. The outer washer 45 is secured on the shaft 36 by a jam nut 47 and cotter pin 48. The washer 46 is disposed between the wheel 37 and an O-ring 49. The O-ring 49, in turn, bears against the sleeve 44. The inner end of the roller 39 is positioned by the serial arrangement of a retaining ring 51, a washer 52, and an O-ring 53 which bears against the sleeve 43. The O-rings 49 and 53 serve to seal the interior of the roller 39 against water and foreign matter. To further seal the interior of the roller 39 against the intrusion of water or foreign matter, a threaded port 54 is provided to the interior of the roller 39 for the introduction of oil under pressure. The port 54 is sealed by a threaded flush plug 55.

Referring primarily to FIGURES 1, 2, and 3, it is seen that an elongate guide member 23 is provided to guide the pintle chain 11 and the yoke-and-roller assemblies 21 as they travel from the idler gear 15 toward the drive gear 14 to convey automobiles in the direction indicated by the arrow 22. The guide member is continuous and extends substantially the entire distance between the idler gear 15 and the drive gear 14. As best illustrated in FIGURE 3, the guide member 23 is preferably fabricated in part from a length of 5/16 inch structural steel angle stock one side of which forms the principal side wall 56 of the guide member and the other side of which forms an anchor flange 57 for the guide member. As its name indicates, the anchor flange 57 enables the guide member 23 to be positioned and securely anchored to the floor by suitable fastening means 58. The top unit 59 of the guide member preferably consists of a length of 1/4 inch steel channel stock welded to the top portion of the principal side wall 56 in inverted position, as illustrated. The bottom unit 61 of the guide member also preferably consists of a length of 1/4 inch steel channel stock welded to the bottom portion of the principal side wall 56. The opposed sides 59a and 61a of the top and bottom units 59 and 61, respectively, effectively define on a longitudinal slot in the outer side of the guide member 23. In short, the guide member 23 is an elongate member of substantially rectangular cross-sectional configuration having a longitudinal slot in its outer side to accommodate travel of the shafts 36 of the yoke-and-roller units 21.

As previously indicated, guide member 23 serves to guide the pintle chain 11 and yokes 27. In this regard, it should be noted that the top wall 29 and bottom wall 31 of the yoke 27 extend inwardly beyond the inner side portion of the pintle chain 11. Hence, due to the manner in which the yokes 27 ride in the guide member 23, the load forces imposed on the shafts 36 are transferred to the guide member 23 by the yokes 27, and not through the pintle chain 11. More specifically, the load force moment produced as a lever arm is borne by the guide member 23 and not by the pintle chain 11. Thus, the guide member 23 eliminates binding problems and protects the pintle chain 11 against damage and wear. To facilitate travel of the chain 11 and yokes 27 through the guide member 23 and to further minimize wear, a lubricant may be applied to the interior of the guide member 23.

Referring now to FIGURE 1 in particular, it is seen that the installation further includes a suitable guide rail 62, such as upstanding length of steel angle stock of approximately the same height as the guide member 23. The guide rail 62 extends in spaced, parallel relationship with the guide member 23 for substantially the complete distance between the idler gear 15 and the drive gear 14 in order to define a channel with the guide member 23 through which the left-side tires of the automobiles being conveyed are forced to travel.

In addition, the installed conveyor preferably includes a protective casing 12 which covers the gears 14 and 15 and the return side of the pintle chain circuit not only to afford protection for the conveyor but also protection of workers and other persons in proximity of the conveyor. It will be noted that the portion of the casing 12 at the entrance to the conveyor is provided with an angular guide portion 12a which cooperates with an angular portion 62a of the guide rail 62 to define an entrance to the guide channel for the left-side tires of the automobiles to be conveyed. Similarly, at the exit from the conveyor, the casing 12 is provided with an angular guide portion 12b which cooperates with an angular portion 62b of the guide rail 62 to define an exit for the left-side tires of conveyed automobiles.

The operation of the automatic automobile conveyor is as follows. The drive gear 14 is driven in the direction indicated in FIGURE 1. Each automobile to be conveyed is driven, in turn, into the entrance of the conveyor such that one left-side tire 71, preferably the left-front tire, is positioned substantiallly as illustrated in FIGURE 1. The next yoke-and-roller unit 21 emerging from the casing 12 engages the lower rear portion of the tire 71 thereby forcing the automobile to move forwardly in the direction indicated by the arrow 22. The roller 39 of the yoke-and-roller unit 21 rotates to accommodate the rolling action of the tire 71 as it moves forward. At the exit end of the conveyor, the tire 71 is urged outwardy by the guide portion 12b of the casing 12 such that the yoke-and-roller unit 21 automatically disengages from the tire 71.

It is important to note that by fixing the orientation of the yoke 27 with respect to the tubular member 25', as previously described, the yoke-and-roller unit 21 travels smoothly around the gears 14 and 15 in the manner illustrated in FIGURE 5. The wheel 37 is not whipped ahead of the tubular member 25' nor does it lag behind, thereby avoiding a bind or drag condition and minimizing wear on the wheel 37. Moreover, the yoke-and-roller unit 21 is enabled to travel smoothly along the return portion of the chain 11 circuit without the necessity of an additional guide member and to enter the guide member 23 from the idler gear 15 in proper alignment.

To minimize wear of the chain 11 during the return portion of its circuit, the bottom of the chain 11 should be sufficiently spaced above the floor 13 so that, with a reasonable degree of tautness present in the chain, it will ride primarily on the one point suspension provided by each wheel 37.

In installations of the type described, a distance of approximately 130 feet spacing between the sprocket gears 14 and 15 would be typical with 10 to 14 yoke-and-roller units mounted on the pintle chain 11 to provide an interval of approximately 21 feet between successive yoke-and-roller units 21.

Referring now to FIGURES 6 through 9, there is shown another form of yoke-and-roller assembly 21 which, in addition to the yoke 27-roller 39-wheel 37 structure shown in FIGURES 1 through 5, includes a strengthening structure comprising generally a shaft 81, a plate member 82, a wheel 83, and a cross member 84.

The shaft 81 is preferably fabricated of steel and is securely affixed at one end to the rearward portion of the side wall 28 of the yoke 27 so that it protrudes horizontally from the yoke 27 in spaced, parallel co-extensive relationship with the shaft 36. The axes of the shaft 36 and the shaft 81 are preferably coplanar. The wheel 83 is suitably journaled on the outer end of the shaft 81, preferably in alignment with the wheel 37. The rigid cross member 84 is secured on outer ends of the shaft 36 by the jam nuts 47 and 85, respectively. Finally, the rigid, preferably steel, plate member 82 is securely affixed at one end to the side wall 28 of the yoke 27 so that the plate member 82 lies substantially in a horizontal plane with its rearward edge portion overlying the shaft 81. To insure a strong, rigid structure, the plate member 82 is affixed to the yoke wall 27 preferably by welds 86 and is affixed to the shaft 81 preferably by welds 87.

The yoke-and-roller assembly 21 of FIGURES 6 through 9 provides enhanced strength and stability. The possibility of buckling or deformation of the roller shaft 36 or the yoke 27 under load is substantially eliminated by this form of structure of the yoke-and-roller assembly 21. In particular, it has been found that this form of yoke-and-roller assembly structure is sufficiently rugged to withstand repeated instances of automobiles being driven over the yoke-and-roller assembly.

While a preferred form of the present invention has been described and illustrated, it is to be understood that this is merely by way of example and is not to be construed in any manner as a limitation. It is contemplated that certain modifications may be made within the scope of the claims without departing from the spirit of the invention. For example, the relative positions of the drive and idler sprocket gears may be interchanged in some instances, or both sprocket gears might be power-driven. Moreover, the conveyor may readily be adapted to engage and direct the right-side tires of the conveyed automobiles rather than the left-side tires as illlustrated. Driving the left-front tire will normally be found to be the preferable method since the left-front tire tends to hug the guide member as it is driven, thereby assuring a positive guiding action, and since the automobile in this case travels over the casing, thereby enabling efficient use of the floor space.

What is claimed is:

1. In an automobile tow conveyor, the combination comprising: an endless pintle chain driven in a horizontal plane on at least one pair of sprocket gears spaced a substantial distance apart; a plurality of elongate yokes spaced along said pintle chain, each yoke being affixed at its forward end to a preselected pintel shaft in said pintle chain; a tire-engaging roller mounted on each of said yokes for free rotation about a horizontal axis and extending outwardly from said yoke; and an elongate guide member for receiving and guiding said yokes and said pintle chain through the conveying portion of the pintle chain circuit.

2. In an automobile tow conveyor, the combination comprising: an endless pintle chain driven in a horizontal plane on a pair of procket gears spaced a substantial distance apart, each link in said pintle chain including a vertical pintle shaft disposed within a vertical tubular member rigidly affixed to a pair of link members; a plurality of elongate yokes, each having an outer side wall with an integral top wall, each of said yokes further being affixed at its forward end to a preselected pintle shaft; means maintaining each of said preselected pintle shafts in a predetermined orientation relative to its associated tubular member; a tire-engaging roller mounted on said side wall of each of said yokes for free rotation about a horizontal axis and extending outwardly from said side wall of said yoke; and an elongate guide member for receiving and guiding said yokes and said pintle chain through the conveying portion of the pintle chain circuit.

3. In an automobile tow conveyor, the combination comprising: an endless pintle chain driven in a horizontal plane on a pair of sprocket gears spaced a substantial distance apart, each link in said pintle chain including a vertical pintle shaft disposed within a vertical tubular member rigidly affixed to a pair of link members; a plurality of elongate yokes, each having an outer side wall with an integral top wall and an integral bottom wall, each of said yokes further being affixed at its forward end to a preselected pintle shaft; means fixing each of said preselected pintle shafts against rotation relative to its associated tubular member; a shaft affixed at one end to said side wall of each of said yokes so as to project outwardly from said side wall at right angles thereto; a wheel mounted for free rotation on the outer end of said shaft; an elongate tire-engaging roller of smaller diameter than said wheel, said tire-engaging roller being mounted for free rotation on said shaft intermediate said wheel and said side wall of said yoke; and an elongate guide member for receiving and guiding said yokes and said pintle chain through the conveying portion of the pintle chain circuit.

4. In an automobile tow conveyor, the combination comprising: an endless pintle chain driven in a horizontal plane on a pair of sprocket gears spaced a substantial distance apart, each link in said pintle chain including a vertical pintle shaft disposed within a vertical tubular member rigidly affixed to a pair of link members; a plurality of elongate yokes, each having an outer side wall with an integral top wall and an integral bottom wall, each of said yokes further being affixed at its forward end to a preselected pintle shaft; means fixing each of said preselected pintle shafts against rotation relative to its associated tubular member; a shaft affixed at one end to said side wall of each of said yokes so as to project outwardly from said side wall at right angles thereto; a wheel mounted for free rotation on the outer end of said shaft; an elongate tire-engaging roller of smaller diameter than said wheel, said tire-engaging roller being mounted for free rotation on said shaft intermediate said wheel and said side wall of said yoke; and an elongate guide member for receiving and guiding said yokes and said pintle chain through the conveying portion of the pintle chain circuit, said guide member having a generally rectangular cross-sectonal configuration with a longitudinal slot in its outer side wall extending the length of said guide member to accommodate travel of said shafts.

5. An automobile tow conveyor comprising: an endless pintle chain driven in a horizontal plane on at least one pair of sprocket gears spaced a substantial distance apart; a plurality of elongate yokes spaced along said pintle chain, each yoke being affixed at its forward end to a preselected pintle shaft in said pintle chain; a tire-engaging roller mounted on each of said yokes for free rotation about a horizontal axis and extending outwardly from said yoke; an elongate guide member for receiving and guiding said yokes and said pintle chain through the conveying portion of the pintle chain circuit; and a guide rail having a portion in spaced, parallel relationship with said guide member for cooperating with said guide member to define a channel for guiding the tires on one side of the automobile being conveyed.

6. An automobile tow conveyor comprising: an endless pintle chain driven in a horizintal plane on a pair of sprocket gears spaced a substantial distance apart, each link in said pintle chain including a vertical pintle shaft disposed within a vertical tubular member rigidly affixed to a pair of link members; a plurality of elongate yokes, each having an outer side wall with an integral top wall, each of said yokes further being affixed at its forward end to a preselected pintle shaft; means maintaining each of said preselected pintle shafts in a predetermined orientation relative to its associated tubular member; a tire-engaging roller mounted on said side wall of each of said yokes for free rotation about a horizontal axis and extending outwardly from said side wall of said yoke; an elongate guide member for receiving and guiding said yokes and pintle chain through the conveying portion of the pintle chain circuit; and a guide rail having a portion in spaced, parallel relationship with said guide member for cooperating with said guide member to define a channel for guiding the tires on one side of the automobile being conveyed.

7. An automobile tow conveyor comprising: an endless pintle chain driven in a horizontal plane on a pair of sprocket gears spaced a substantial distance apart, each link in said pintle chain including a vertical pintle shaft disposed within a vertical tubular member rigidly affixed to a pair of link members; a plurality of elongate yokes, each having an outer side wall with an integral top wall and an integral bottom wall, each of said yokes further being affixed at its forward end to a preselected pintle shaft; means fixing each of said preselected pintle shafts against rotation relative to its associated tubular member; each of said yokes having a shaft affixed at one end to said side wall so as to project outwardly from said side wall at right angles thereto; a wheel mounted for free rotation on the outer end of said shafts; an elongate tire-engaging roller of smaller diameter than said wheel mounted for free rotation on said shaft intermediate said wheel and said side wall of said yoke; an elongate guide member for receiving and guiding said yokes and said pintle chain through the conveying portion of the pintle chain circuit; a protective casing overlying a portion of said tow conveyor; and a guide rail having a portion in spaced, parallel relationship with said guide member for cooperating with said guide member to define a channel for guiding the tires on one side of the automobile being conveyed, said protective casing and said guide rail having first angular portions which coperate to guide said tires on one side of the automobile into said channel for engagement of one of said tires by one of said tire-engaging rollers, said casing having a second angular portion for guiding automobile tires out of said channel and for urging said one tire out of engagement with said tire-engaging roller.

8. An automobile tow conveyor comprising: an endless pintle chain driven in a horizontal plane on a pair of sprocket gears spaced a substantial distance apart, each link in said pintle chain including a vertical pintle shaft disposed within a vertical tubular member rigidly affixed to a pair of link members; a plurality of elongate yokes, each having an outer side wall with an integral top wall and an integral bottom wall, each of said yokes further being affixed at its forward end to a preselected pintle shaft; means fixing each of said preselected pintle shafts against rotation relative to its associated tubular member; a shaft affixed at one end to said side wall of each of said yokes so as to project outwardly from said side wall at right angles thereto; a wheel mounted for free rotation on the outer end of said shaft; an elongate tire-engaging roller of smaller diameter than said wheel, said tire-engaging roller being mounted for free rotation on said shaft intermediate said wheel and said side wall of said yoke; an elongate guide member for receiving and guiding said yokes and said pintle chain through the conveying portion of the circuit of said pintle chain, said guide member having a generally rectangular cross-sectional configuration with a longitudinal slot in its outer side wall extending the length of said guide member to accommodate travel of said shafts; a protective casing overlying a portion of said tow conveyor; and a guide rail having a portion in spaced, parallel relationship with said guide member for cooperating with said guide member to define a channel for guiding the tires on one side of the automobile being conveyed, said protective casing and said guide rail having first angular portions which cooperate to guide said tires on one side of the automobile into said channel for engagement of one of said tires by one of said tire-engaging rollers, said casing having a second angular portion for guiding automobile tires out of said channel and for urging said one tire out of engagement with said tire-engaging roller.

9. In an automobile tow conveyor, the combination comprising: an endless pintle chain driven in a horizontal plane on at least one pair of sprocket gears spaced a substantial distance apart; a plurality of elongate yokes spaced along said pintle chain, each yoke being affixed at its forward end to a preselected pintle shaft in said pintle chain; a shaft affixed to a forward portion of each of said yokes so as to project horizontally from said yoke; a first wheel rotatably mounted on the outer end of each of said shafts; a tire-engaging roller rotatably mounted on each of said shafts; means mounted on each of said yokes and rigidly interconnected between the outer end of said shaft and said yoke for strengthening said yoke and said shaft, said means including a second wheel; and an elongate guide member for receiving and guiding said yokes and said pintle chain through the conveying portion of the pintle chain circuit.

10. In an automobile tow conveyor, the combination comprising: an endless pintle chain driven in a horizontal plane on at least one pair of sprocket gears spaced a substantial distance apart; a plurality of elongate yokes spaced along said pintle chain, each yoke being affixed at its forward end to a preselected pintle shaft in said pintle chain; a pair of first and second shafts affixed to each of said yokes adjacent the forward and rearward ends, respectively, of each of said yokes so as to project horizontally therefrom in spaced, parallel, substantially co-extensive relationship with one another; a wheel rotatably mounted on the outer end of each of said first and second shafts; a tire-engaging roller rotatably mounted on each of said first shafts; a rigid cross member joining the outer ends of said first and second shafts in each said pair thereof; a rigid plate disposed in substantially a horizontal plane and affixed at one end to each of said yokes and affixed at its rearward end to an associated one of said second shafts; and an elongate guide member for receiving and guiding said yokes and said pintle chain through the conveying portion of the pintle chain circuit.

11. In an automobile tow conveyor, the combination comprising: an endless chain having a plurality of pintle shafts and driven in an elongate circuit on at least one pair of sprocket gears, at least the major portions of the conveying and return legs of said elongate circuit being in a common horizontal plane; a plurality of elongate members, each rigidly affixed at its forward end to a preselected one of said pintle shafts; a plurality of roller shafts each rigidly affixed at one end to one of said elongate members so as to extend outwardly therefrom in a plane perpendicular to said preselected pintle shaft; a plurality of tire-engaging rollers each mounted on one of said roller shafts for free rotation about said roller shaft; and stationary, elongate guide means for guiding said elongate members through said conveying leg of said elongate circuit.

12. In an automobile tow conveyor, the combination comprising: an endless chain having a plurality of pintle shafts and driven in an elongate circuit, at least the major portions of the conveying and return legs of said elongate circuit being in a common horizontal plane; a plurality of roller shafts; a plurality of tire-engaging rollers, each mounted on one of said roller shafts for free rotation about said roller shaft; means associated with each of said roller shafts for connecting said roller shaft to a preselected one of said plurality of pintle shafts such that said roller shaft extends outwardly with respect to said chain in a plane perpendicular to said preselected pintle shaft; and a stationary guide member for guiding said means through the conveying leg of said elongate circuit, said means being adapted to transmit load forces experienced by its associated tire-engaging roller directly to said guide member.

13. In an automobile conveyor, the combination comprising: an endless chain driven in an elongate circuit and having a plurality of pintle portions associated with respective links in said chain, at least the major portions of the conveying and return legs of said elongate circuit being in a common horizontal plane; a plurality of roller shafts; a plurality of tire-engaging rollers, each mounted on one of said roller shafts for free rotation about said roller shaft; means associated with each of said roller shafts for rigidly connecting said roller shaft to a preselected one of said links of said chain such that said roller shaft extends outwardly with respect to said chain in a direction perpendicular to the direction of longitudinal orientation of said link and such that said roller shaft is adapted to travel in said common horizontal plane; and a stationary guide member for guiding said means through the conveying leg of said elongate circuit, said means including a portion overlying and wider than said chain, said portion being adapted to be transversely embraced by said guide member such that load force moments exerted by said roller shafts are borne by said guide member and not by said chain when said means is being guided through the conveying leg of said elongate circuit.

14. A conveyor apparatus for propelling an automobile having at least one tire adapted to be moved through an automobile treatment facility along a predetermined path, said conveyor apparatus comprising: endless flexible driving means located for travel partially along said predetermined path; means for maintaining said endless driving means in a driving position along said predetermined path; means for engaging said automobile tire; means connecting said tire-engaging means to said endless driving means so as to maintain said tire-engaging means perpendicular to the direction of travel of said endless driving means; and rigid elongated guide means located along said predetermined path for accommodating and guiding said connecting means, said connecting means including a portion overlapping and wider than said flexible driving means, said portion being adapted to be transversely embraced by said guide means such that load force moments exerted by said tire-engaging means are borne by said guide means and not by said flexible driving means when said connecting means is being accommodated and guided by said guide means.

References Cited by the Examiner
UNITED STATES PATENTS

| | | | |
|---|---|---|---|
| 1,635,085 | 7/1927 | Johnson | 198—175 |
| 3,058,433 | 10/1962 | Hurst | 104—172 |

SAMUEL F. COLEMAN, *Primary Examiner.*

R. AEGERTER, *Examiner.*

UNITED STATES PATENT OFFICE
CERTIFICATE OF CORRECTION

Patent No. 3,233,557                                     February 8, 1966

Allen D. Rickel

It is hereby certified that error appears in the above numbered patent requiring correction and that the said Letters Patent should read as corrected below.

Column 3, line 69, after "produced" insert -- by the roller shaft 36 acting --; column 4, line 31, for "substantiallly" read -- substantially --; column 5, line 45, for "pintel" read -- pintle --; line 54, for "procket" read -- sprocket --; column 7, line 29, for "coperate" read -- cooperate --.

Signed and sealed this 10th day of January 1967.

(SEAL)
Attest:

ERNEST W. SWIDER                                             EDWARD J. BRENNER
Attesting Officer                                                  Commissioner of Patents

Disclaimer 3,233,557.—*Allen D. Rickel*, Northfield, Ill. AUTOMOBILE CONVEYOR. Patent dated Feb. 8, 1966. Disclaimer filed Sept. 15, 1969, by the assignee, *Auto Laundry Equipment Sales Company*.

Hereby enters this disclaimer to claims 1, 5, 11, 12 and 14 of said patent.

[*Official Gazette January 20, 1970.*]